May 14, 1946.  C. E. MARKHAM ET AL  2,400,156
ENGINE CHARGE FORMING DEVICE
Filed April 29, 1942    2 Sheets-Sheet 1

INVENTOR
CHARLES E. MARKHAM
CHARLES L. MARTIN
Donald U. Rice
ATTORNEY

Patented May 14, 1946

2,400,156

UNITED STATES PATENT OFFICE 2,400,156

ENGINE CHARGE FORMING DEVICE

Charles E. Markham, St. Louis, and Charles L. Martin, Overland, Mo., assignors to Carter Carburetor Corporation, St. Louis, Mo., a corporation of Delaware Application April 29, 1942, Serial No. 440,914

12 Claims. (Cl. 123—25)

This invention relates to charge forming devices for internal combustion engines and particularly concerns means for adding water vapor or steam to the combustible charge supplied to the engine.

The introduction of water or water vapor into the engine combustion chamber or into the fuel charge for the purpose of reducing combustion chamber temperature, and thereby reducing the tendency of the engine to knock or detonate, has been proposed. Inasmuch, however, as combustion chamber pressures and temperatures and, therefore, the tendency to detonate increases with the volume of fuel charge taken into the cylinders, it becomes apparent that the amount of moisture required will increase as the volume increases. Obviously, at dead idle or in the lower part throttle range of operation, objectionable detonation is not likely to occur in practice and usually does not occur below one-half to three-quarters of the full volume.

Therefore, for economy of supply and for the reason that greater than the required amounts of moisture would cause irregular operation at idle and at low volume operation, a control of the moisture supply in accordance with requirements is imperative. It may be added that while the cost of moisture is nil, the proportions of the reservoir for carrying it and the frequency of replenishing the supply are matters of considerable importance.

It has been found that to effectively reduce detonation, considerable quantities of moisture must be introduced at the proper time and, if introduced into the mixture at a point some distance from the combustion chamber, as at the carburetor, it must be in such form as to be easily carried in the air stream; due to the fact that at low speed wide open throttle operation the engine is operating at near maximum volume requiring the greatest amount of moisture and the velocity of the air stream is very low.

It is an object of the present invention to provide improved means for generating and introducing water vapor or steam into the combustible mixture.

It is a further object of the present invention to provide a means for controlling the amount of water, vapor or steam introduced into the combustible mixture in accordance with the requirements of the engine.

Other objects and advantages will become apparent upon reference to the following description and accompanying drawings in which Fig. 1 is a plan view of internal combustion engine manifolds and carburetor and a steam generating device arranged therewith according to one form of our invention.

Figure 1:
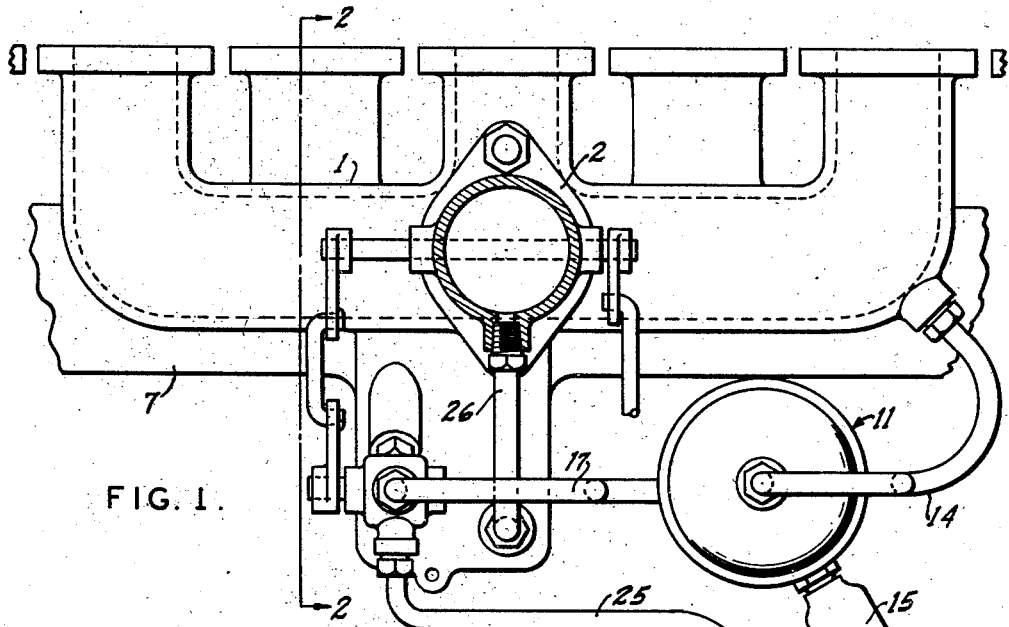

Numeral 1 indicates the intake manifold of an internal combustion engine having a carburetor 2 (shown in part) connected thereto by means of stud 3 and nut 4. Carburetor 2 may be of any suitable type having a mixture conduit 5 and a throttling valve 6 for control of the mixture outlet. An engine exhaust manifold lying immediately below the intake manifold is indicated at 7. A reservoir 7a formed as an integral part of the exhaust manifold serves as a small flash boiler. This boiler may be constructed in any suitable manner; however, it is preferable to arrange the structure so that one wall is formed by a portion of the exhaust manifold in order to obtain a high temperature surface for the purpose of instantly vaporizing sufficient quantities of water. The boiler 7a is provided with a vent 8 having a restriction 9 therein.

A source of water is indicated by a fragmentary portion of a water reservoir at 10. A spring discharged vacuum operated injector pump for delivering the water from reservoir 10 to boiler 7 under pressure is provided and generally indicated at 11. Pump 11 comprises a bell 12 within which is suitably arranged a metal bellows 13. The interior of bellows 13 is connected to the intake manifold 1 by means of a suction pipe 14. Water is conveyed from reservoir 10 to bell 12 by a conduit 15 in which is interposed an intake check valve fitting 16. Water is delivered from pump 11 to boiler 7 through a conduit 17 in which is interposed a three-way valve 18. Valve 18 is provided with an operating lever 18a which is connected by means of a link 19 to a lever 20 rigidly attached to the carburetor throttle valve shaft 21.

Water is discharged against the wall of the exhaust manifold 7 through a suitable spray nozzle 22. It is the intention to provide sufficient discharge pressure and to construct the spray nozzle so as to cause the water to be discharged against the exhaust manifold wall in a finely divided spray. Valve 18 being a rotatable plug type is provided with a plug 23 having a pair of drilled passages 24 and 24a. A return line 25 leading from valve 18 to the reservoir 10 is provided and when the valve is in the position shown in Fig. 3, discharge from pump 11 will be returned to the water reservoir 10. When the valve plug 23 is rotated so that passage 24 is in a vertical position, water will be conveyed from pump 11 to boiler 7a and passage 24a will be out of register. Vapor or steam generated in boiler 7a is conveyed to the carburetor mixture conduit at a point above the throttle valve through a conduit 26.

Figure 2:
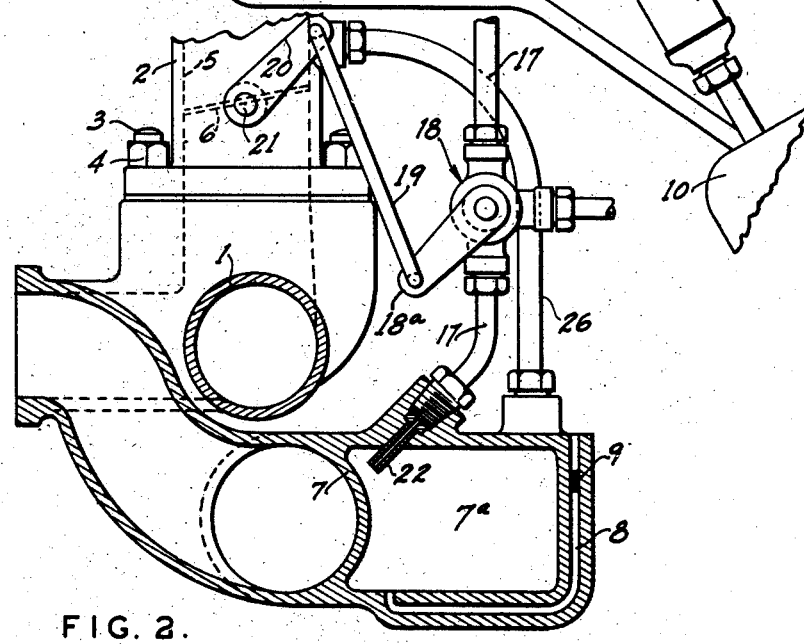
Fig. 2 is a part sectional elevation taken on line 2—2 of Fig. 1.
Figure 3:
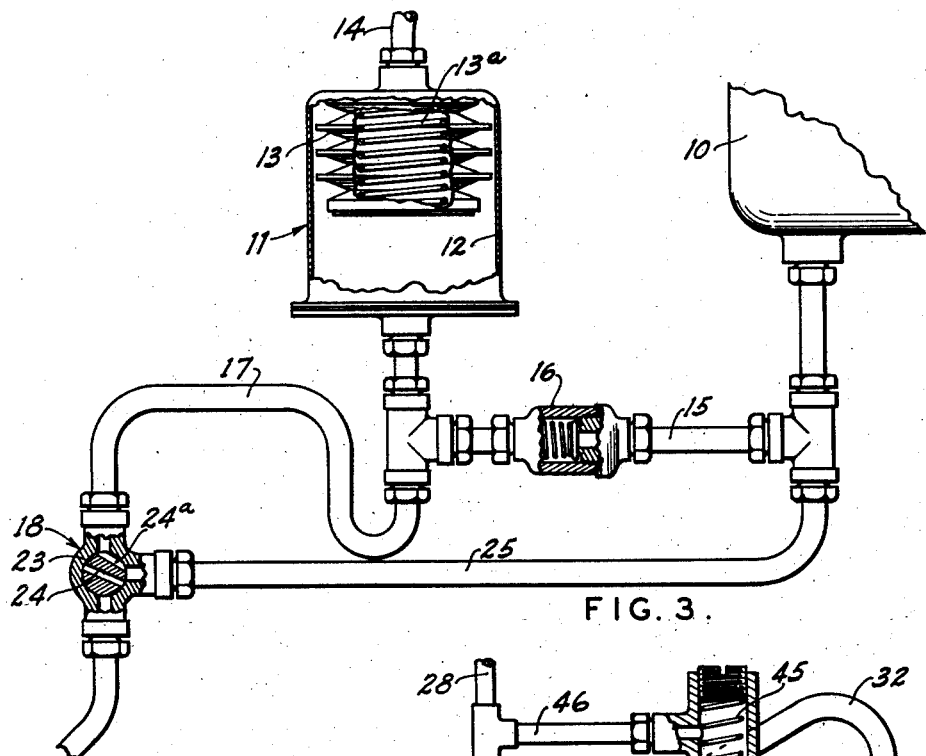
Fig. 3 is a diagrammatic arrangement of the water supply tank and injector pump shown in Fig. 1.

The operation of the device shown in Figs. 1 to 3 is as follows:

When the engine, to which the manifolds 1 and 7 are connected, is operating with the carburetor throttle valve in a nearly closed position or in any partially open position of less than that in which it has been determined sufficient volume could pass under any load to cause objectionable detonation; the valve 18 will be in the position shown. That is, in which discharge to the boiler is prevented. Also, in this range of operation, relatively high suction will prevail in the intake manifold and bellows 13 of pump 11 will be in the retracted position shown. As the throttle is moved openward, passageway 24 in valve 18 will be moved toward a vertical position by reason of the interconnecting mechanism and water will be discharged into the boiler 7a; but only, however, if the load on the engine is sufficient to reduce the engine speed enough to cause a loss of manifold vacuum which will permit the extension of bellows 13 under the influence of bellows spring 13a.

By this arrangement, the discharge of water into boiler 7a and, consequently, the vapor or steam discharged into the mixture conduit will be controlled in accordance with the intake manifold vacuum posterior to the throttle; and, consequently, in accordance with the volume. Also, by this arrangement, water in pump 11 will be returned to the water reservoir 10 when the manifold vacuum drops for any reason when the throttle valve is closed, as when the operation of the engine is discontinued. This prevents the introduction of vapor which would later condense and possibly freeze in the mixture conduit during inoperation. Further, by this arrangement, the vapor or steam is admitted above the throttle valve whereby the vapor conveying conduit is not exposed to high manifold suctions existing during idling operation. The venting of boiler 7a permits some air to flow into boiler 7a when steam conduit 26 is subjected to suction, as when the throttle is partially open, thus more effectively evacuating vapor from the boiler. The vent is restricted, however, to prevent any appreciable loss of steam under other operating conditions.

Figure 4:
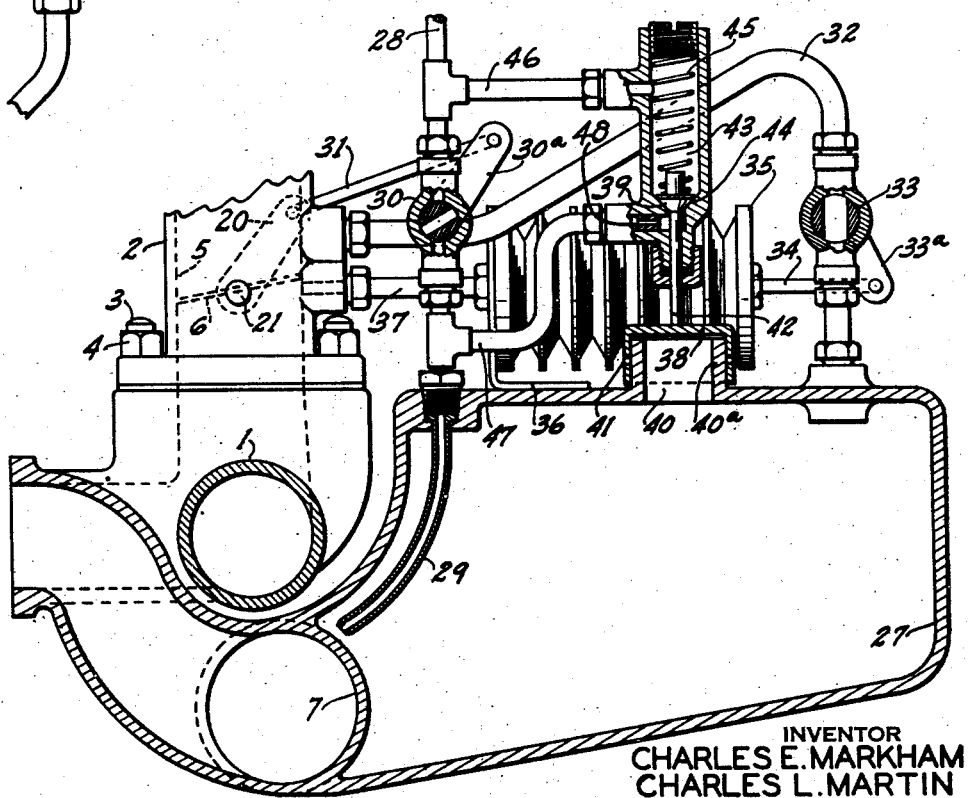
Fig. 4 shows a somewhat diagrammatic arrangement of a modified form of the present invention.

In the modification shown in Fig. 4, a low pressure type boiler 27 is provided and arranged so as to have a portion of its wall formed as the wall of the exhaust manifold 7. Water is conveyed through the conduit 28 to the nozzle 29 from whence it discharges against the exhaust manifold. In this arrangement, the water need not be sprayed under any substantial pressure against the manifold; it may be fed to nozzle 29 by gravity from a reservoir (not shown) suitably located above the boiler. A rotatable plug valve 30 interposed in conduit 28 controls the flow to nozzle 29. Valve 30 is provided with an operating lever 30a connected to the carburetor throttle valve lever 20 by a link 31. As shown, valve 30 is in the closed position and is arranged to be opened as the throttle valve 6 is moved openward beyond a predetermined position.

It is the intention in this arrangement to maintain, during operation of the engine, a volume of comparatively low and substantially constant pressure of approximately two or three pounds per square inch in boiler 27 so that upon acceleration of the engine, steam is immediately available under pressure for introduction into the mixture. Steam is conveyed from boiler 27 to the mixture conduit 5 by the steam conduit 32. Interposed in conduit 32 is a control valve 33 (shown in open position). Valve 33 is provided with an operating lever 33a which is connected by means of a link 34 to the free end of a bellows 35. Bellows 35 is held normally extended in the position shown (so as to hold valve 33 open) by an interior spring (not shown), and is fixed at its opposite end by means of a bracket 36 to any convenient or suitable part of the engine. The interior of bellows 35 is connected to the engine intake manifold at a point posterior to the throttle by a suction conduit 37.

The mechanism provided for maintaining a substantially constant pressure of steam in boiler 27 consists of a pressure regulating valve 38 and a water admission control valve 39 co-acting therewith. A suitable pressure release opening 40 having a rim 40a is provided in the top of boiler 27 over which is placed in sliding fit relationship the inverted cup valve 38. Valve 38 has a plurality of holes 41 in the side walls thereof permitting release of pressure from the boiler as the valve is lifted. Valve 38 has a stem 42 extending upwardly and into the valve chamber 43. On the upper end of stem 42 is formed a valve 39. A valve seat 44 for engagement with valve 39 is provided in the lower part of valve chamber 43. A spring 45 in the upper part of chamber 43 urges the valves 39 and 38 toward a closed position.

As the pressure in the boiler 27 becomes excessive valve 38 is lifted against spring 45 which is calibrated to maintain the desired pressure. As valve 38 is lifted, valve 39 is also lifted from its seat permitting a relatively small amount of water to enter the boiler through the by-pass which comprises a conduit 46, the valve chamber 43 and conduit 47. A restriction 48 is provided in the outlet from valve chamber 43 to limit the flow through the by-pass. With the present arrangement which involves the utility of exhaust manifold heat, a volume of available steam can be maintained without excessive loss of moisture.

The operation of the device shown in Fig. 4 is as follows:

When the engine is operating on restricted volume, the intake manifold vacuum will be relatively high. Under these conditions, suction acting on bellows 35 will cause valve 33 to be closed. As the throttle valve is moved open beyond a predetermined point, water admission valve 30 will be opened. The calibration of the suction opposing spring (not shown) within bellows 35 and the relationship between throttle valve 6 and water admission valve 30 will be such for any particular engine that valve 33 will always be opened by the suction opposing spring against any suction which the engine would be capable of pumping at a throttle opening sufficient to open the valve 30. However, operating conditions will occur during which the manifold vacuum may drop sufficiently to permit the opening of valve 33 although the throttle is not opened sufficiently to open the valve 30, as when accelerating. With this arrangement, a supply of steam under pressure is maintained for instant release into the mixture, and in sufficient quantities to meet requirements when accelerating, and its release is automatically controlled in accordance with manifold vacuum. For prolonged operation at substantially full volume, additional water is admitted to the boiler through valve 30 which is controlled by throttle position.

The foregoing description and accompanying drawings are intended to be illustrative and not limiting and we contemplate the use of all modifications properly within the scope of the appended claims.

We claim:

1. An internal combustion engine having in combination an intake manifold, a carburetor having a mixture conduit, a throttle valve in said conduit, means for introducing steam into said mixture conduit at a point anterior to said throttle, and means for controlling the introduction of steam thereinto in accordance with variation in the suction posterior to said throttle.

2. An internal combustion engine having in combination an induction conduit, a throttle valve for controlling said conduit, means for supplying steam to said induction conduit including a steam conduit leading thereto, a valve in said steam conduit, and a pressure responsive device connected to and responsive to the pressure in said induction conduit at a point posterior to said throttle for actuating said steam control valve.

3. An internal combustion engine having in combination an induction conduit, a throttle valve for controlling said conduit, means for supplying steam to said induction conduit including a steam conduit leading to said induction conduit at a point anterior to said throttle, a valve in said steam conduit, and a pressure responsive device connected to and responsive to the pressure in said induction conduit at a point posterior to said throttle for actuating said steam control valve.

4. An internal combustion engine having in combination an induction conduit, a throttle valve for controlling said conduit, means for supplying steam to said induction conduit comprising a flash boiler, a constantly open steam conduit leading from said boiler to a point in said induction conduit anterior to said throttle, a feed water reservoir, and a suction loaded, spring discharged injection pump receiving water from said reservoir, said injection pump having a suction connection with said induction conduit at a point posterior to said throttle and being constructed and arranged to discharge into said boiler only upon a drop in engine suction.

5. An internal combustion engine having in combination an induction conduit, a throttle valve for controlling said conduit, means for supplying steam to said induction conduit comprising a flash boiler, a steam conduit leading from said boiler to said induction conduit, a feed water reservoir, a suction loaded spring discharged injection pump receiving water from said reservoir and discharging into said flash boiler and having a suction connection to said induction conduit for the operation thereof, means including a valve for returning the discharge from said pump to said reservoir under certain conditions, and an operative connection between said last mentioned valve and said throttle valve.

6. An internal combustion engine having in combination an induction conduit, a throttle valve in said conduit, means for supplying steam to said conduit comprising a boiler, a steam conduit leading from said boiler to said induction conduit, a feed water reservoir, a water conduit leading from said reservoir to said boiler, a throttle operated valve in said water conduit, means forming a by-pass around said throttle operated valve, a valve for controlling said by-pass, and means responsive to the pressure in said boiler for operating said by-pass valve.

7. An internal combustion engine having in combination an induction conduit, means for supplying steam to said induction conduit including a boiler, a feed water reservoir, and means for maintaining a substantially constant pressure of steam in said boiler comprising a water conduit leading from said reservoir to said boiler, a valve in said water conduit, a spring opposed pressure relief valve in said boiler, and an operative connection between said pressure relief valve and said water control valve.

8. An internal combustion engine having in combination an induction conduit, a throttle valve for controlling said conduit, means for supplying steam to said induction conduit comprising a flash boiler, passages connecting said boiler to a source of water supply and to said induction conduit, a throttle operated valve in one of said passages, a feed water reservoir, and a suction operated injection pump receiving water from said reservoir and discharging into said flash boiler, said pump having a suction connection with said induction conduit and being constructed and arranged to discharge only upon changes in engine suction conditions.

9. An internal combustion engine having in combination an induction conduit, a throttle valve in said induction conduit, means for supplying steam to said induction conduit comprising a constant pressure boiler, a source of feed water for said boiler, a conduit for conveying steam from said boiler to said induction conduit, means for controlling the admission of steam to said induction conduit in accordance with the suction therein posterior to said throttle, and means for controlling the admission of feed water to said boiler in accordance with the position of said throttle.

10. An internal combustion engine having in combination an induction conduit, a throttle valve in said conduit, means for supplying steam to said induction conduit comprising a constant pressure boiler, a source of feed water for said boiler, a conduit for conveying steam from said boiler to said induction conduit, means for controlling the admission of steam to said induction conduit in accordance with the suction therein posterior to said throttle, and means for controlling the admission of feed water to said boiler in accordance with the pressure in said boiler.

11. An internal combustion engine having in combination an induction conduit, a throttle valve in said induction conduit, means for supplying steam to said induction conduit comprising a constant pressure boiler, a source of feed water for said boiler, a conduit for conveying steam from said boiler to said induction conduit, means for controlling the admission of steam to said induction conduit in accordance with the suction therein posterior to said throttle, means for controlling the admission of feed water to said boiler in accordance with the pressure in said boiler, and means for admitting relatively greater quantities of feed water to said boiler in accordance with the position of said throttle.

12. An internal combustion engine having in combination an exhaust manifold, a carburetor having a mixture conduit and a throttle therein, an evaporating chamber adjacent said exhaust manifold and having at least a portion of one wall in contact therewith, passage means for supplying water to said chamber and steam from said chamber to said mixture conduit, and devices in said passage means operated by opening of said throttle and variations in suction in said conduit from that existing during part throttle operation, said devices cooperating to cause the introduction of steam from said chamber into said conduit.

CHARLES E. MARKHAM.
CHARLES L. MARTIN.